(12) United States Patent
Profit et al.

(10) Patent No.: US 10,081,557 B2
(45) Date of Patent: Sep. 25, 2018

(54) LIQUID TREATMENT DEVICE

(71) Applicant: ISB WATER, Nanterre (FR)

(72) Inventors: Grégoire Profit, Sevres (FR);
Alexandre Profit, Meudon (FR)

(73) Assignee: ISB WATER, Nanterre (FR)

( * ) Notice: Subject to any disclaimer, the term of this patent is extended or adjusted under 35 U.S.C. 154(b) by 0 days.

(21) Appl. No.: 14/762,400

(22) PCT Filed: Jan. 16, 2014

(86) PCT No.: PCT/IB2014/058336
§ 371 (c)(1),
(2) Date: Jul. 21, 2015

(87) PCT Pub. No.: WO2014/111880
PCT Pub. Date: Jul. 24, 2014

(65) Prior Publication Data
US 2015/0353380 A1    Dec. 10, 2015

(30) Foreign Application Priority Data

Jan. 21, 2013    (FR) ...................................... 13 50513

(51) Int. Cl.
*C02F 1/20*        (2006.01)
*C02F 1/52*        (2006.01)
(Continued)

(52) U.S. Cl.
CPC .................. *C02F 1/20* (2013.01); *C02F 1/52* (2013.01); *B01D 19/00* (2013.01);
(Continued)

(58) Field of Classification Search
CPC ........ C02F 1/20; C02F 1/52; C02F 2101/006; C02F 2101/12; C02F 2103/42;
(Continued)

(56) References Cited

U.S. PATENT DOCUMENTS 2,566,065 A * 8/1951 Loverde .................. C07C 17/14
                                                   204/157.99
5,232,596 A * 8/1993 Castaldi .................... B09C 1/10
                                                   210/603
(Continued)

FOREIGN PATENT DOCUMENTS

CN         201567249 U      9/2010
CN         102795727 A     11/2012
(Continued)

OTHER PUBLICATIONS

Machine-generated translation of FR 2950047, generated on Oct. 22, 2016.*

(Continued)

*Primary Examiner* — Fred Prince
(74) *Attorney, Agent, or Firm* — Oliff PLC (57) ABSTRACT

The invention relates to a device for treating a liquid containing a dissolved gas, said device comprising: a hydrodynamic reactor capable of generating, by cavitation, bubbles of said gas within said liquid, and a gas separator capable of extracting said bubbles from said liquid.

12 Claims, 2 Drawing Sheets

(51) Int. Cl.
　　B01D 19/00　　(2006.01)
　　*C02F 101/00*　　(2006.01)
　　*C02F 101/12*　　(2006.01)
　　*C02F 103/42*　　(2006.01)
　　*C02F 103/02*　　(2006.01)

(52) U.S. Cl.
　　CPC .... *C02F 2101/006* (2013.01); *C02F 2101/12* (2013.01); *C02F 2103/02* (2013.01); *C02F 2103/023* (2013.01); *C02F 2103/42* (2013.01)

(58) Field of Classification Search
　　CPC ........... C02F 2103/023; C02F 2103/02; B01D 19/00; B01D 19/0084; B01D 19/0094
　　USPC ................ 210/748.17, 188; 95/241, 260
　　See application file for complete search history.

(56) References Cited

U.S. PATENT DOCUMENTS

| | | | |
|---|---|---|---|
| 2003/0111429 | A1 | 6/2003 | Montalvao et al. |
| 2007/0000835 | A1* | 1/2007 | Gordon ................ B01D 61/025 210/603 |
| 2010/0151540 | A1* | 6/2010 | Gordon ................ B01F 5/0644 435/134 |
| 2011/0065969 | A1* | 3/2011 | Chan ........................ C10G 3/00 585/324 |

FOREIGN PATENT DOCUMENTS

| | | |
|---|---|---|
| EP | 0 680 457 B2 | 9/1999 |
| JP | H08-505809 A | 6/1996 |
| JP | 2003170035 A | 6/2003 |
| JP | 2007-289958 A | 11/2007 |
| RU | 29 248 U1 | 5/2003 |
| RU | 2 284 966 C2 | 10/2006 |
| RU | 2 314 261 C2 | 1/2008 |
| SU | 656639 A1 | 4/1979 |
| SU | 912201 A1 | 3/1982 |
| WO | 94/17000 A1 | 8/1994 |
| WO | 00/07941 A1 | 2/2000 |
| WO | 2012/161366 A1 | 11/2012 |

OTHER PUBLICATIONS

Aug. 23, 2016 Office Action issued in Chinese Patent Application No. 201480017288.1.
Jul. 7, 2017 Examination Report on Patent Application issued in Chilean Application No. 201502032.
Apr. 24, 2017 Office Action issued in Japanese Application No. 2015-553209.
Dec. 6, 2017 Office Action issued in Russian Application No. 2015132586/05(050095).

\* cited by examiner

LIQUID TREATMENT DEVICE

TECHNICAL FIELD

The invention relates to a device for treating a liquid containing a dissolved gas, in particular for treating a liquid that has passed through a heat exchanger, a cooling tower, a pool, especially a public or private swimming pool, a cooling or air-conditioning circuit, a heating circuit, a filtration circuit, a reverse osmosis demineralization circuit, a domestic hot water circuit, or a drinking water distribution circuit. Generally, the invention relates to a device for treating an aqueous liquid containing a dissolved gas from an industrial process circuit, with or without raw sewage, for example household wastewater or a leachate.

PRIOR ART

In these applications, the presence of certain (solid, liquid or gaseous) substances or of microorganisms leads to undesirable silting and/or scaling and/or corrosion and/or clogging phenomena. The liquid must therefore be treated periodically by injection of additives, for example by injection of disinfectants, flocculants, acids or sequestrants, or even be drained and replaced periodically. These treatments are expensive and often harmful to the environment.

There is therefore a need for a novel treatment solution that makes it possible to at least partially solve these problems.

SUMMARY OF THE INVENTION

According to the invention, this objective is achieved by means of a device for treating a liquid containing a dissolved gas, said device comprising:
  a hydrodynamic reactor capable of generating, by cavitation, bubbles of said gas within said liquid,
  a gas separator capable of extracting said bubbles from said liquid.

As will be seen in greater detail in the remainder of the description, such a device makes it possible, simply and effectively, to treat the liquid with a reduced consumption of additives, or even without the use of additives, and/or to limit the rate of replacement of said liquid.

Without being tied to one theory, the inventors explain this result in the following manner: the hydrodynamic reactor makes it possible, by a sudden expansion, to evaporate, by cavitation, a portion of the gases dissolved in the liquid, whilst the gas separator traps the gas bubbles thus formed before this gas is dissolved again in the liquid by compression downstream. The pressure of gas in the liquid (i.e. the concentration of dissolved gas) leaving the device is therefore lower than that in the liquid entering the device.

The device thus makes it possible to reduce the pressure of the dissolved gas, and therefore to reduce its harmfulness.

Cavitation is a well-known phenomenon which is generally dreaded because it considerably modifies the structure and the properties of liquid flows. The inventor is credited with having conceived a device which advantageously uses this phenomenon.

This degassing downstream of the hydrodynamic reactor makes it possible in particular to eliminate $CO_2$ and/or $O_2$, thus creating, within said liquid, novel conditions for physicochemical equilibria, such as the calcium-carbon equilibrium, for example.

This downstream degassing also makes it possible to eliminate undesirable gases, such as chloramines, and in particular trichloramines, which are very harmful to health, and which may appear during the treatment of swimming pool waters.

A device according to the invention may also comprise one or more of the following optional features:
  the gas separator is positioned downstream of the hydrodynamic reactor, preferably at a distance of less than 2 meters, preferably less than 1 meter from the hydrodynamic reactor;
  the gas separator is adapted so that, in said gas separator, the liquid is maintained under pressure, and in particular is not exposed to the atmosphere, as in a pool; and/or the liquid is not brought into contact with an external gas (i.e. the only gas with which the liquid is in contact is that of the bubbles extracted by cavitation) (in particular, the liquid is not placed in a tank so that its free surface is in contact with the atmosphere);
  the gas separator is a coalescing separator or a brush filter;
  the hydrodynamic reactor comprises a dielectric material capable of coming into contact with the liquid;
  the hydrodynamic reactor comprises first channels delimited at least in part, or even completely, by a dielectric material;
  the hydrodynamic reactor comprises, preferably downstream of the dielectric material, means for separating suspended particles, in particular settling means and/or a filter;
  the filter is selected from the group formed by a brush filter, a disc filter, a granular media filter, an ultrafiltration membrane, in particular a hollow fiber ultrafiltration membrane, a nanofiltration membrane, especially alone or downstream of an ultrafiltration membrane, or a reverse osmosis membrane;
  the hydrodynamic reactor comprises first channels, preferably delimited internally by a dielectric material, that open downstream into a compression chamber, the passage of the liquid in the first channels giving rise to the acceleration thereof and the generation of cavitation bubbles, before it is injected into the compression chamber, the passage of the liquid in the compression chamber giving rise to the implosion of most of the cavitation bubbles;
  the hydrodynamic reactor comprises second channels, preferably delimited internally by an electrically conductive material, preferably by zinc, that open upstream into the compression chamber, the passage of the liquid in the second channels giving rise to the acceleration thereof and the generation of cavitation bubbles; preferably, the hydrodynamic reactor comprises a second compression chamber into which the second channels, downstream, open, so as to implode most of the cavitation bubbles generated in the second channels;
  the hydrodynamic reactor comprises a first block comprising a plurality of said first channels, a compression chamber, and preferably a second block comprising a plurality of said second channels, the first channels, and where appropriate the second channels, opening into said compression chamber so that a liquid entering the hydrodynamic reactor successively passes through the first channels, the compression chamber and the second channels;
  preferably, the first channels are delimited by an internal wall made of a dielectric material, preferably a plastic, preferably made of polytetrafluoroethylene (PTFE);
  preferably, the second channels are delimited by an internal wall made of an electrically conductive material capable of serving as a sacrificial anode in order to protect the circuit in which the liquid to be treated circulates;

preferably, the first and second blocks are inserted into a housing having an inlet and an outlet, all the liquid entering the housing having to pass through the first channels, the compression chamber and the second channels before leaving the housing;

preferably, the housing is in electrical contact with said electrically conductive material;

more than 50% by number of the bubbles generated in the hydrodynamic reactor have a diameter between 0.2 µm and 5 mm, preferably between 0.2 µm and 2 mm;

the hydrodynamic reactor is a hydrodynamic reactor described in patent EP-B2-680 457;

a liquid circulates in the hydrodynamic reactor, this liquid preferably containing at least one compound containing an element selected from the group formed by chlorine, aluminum, bromine, chromium or strontium, in particular a radioactive metal.

The invention also relates to a system comprising, or even constituted by, a circuit, inserted wherein are a target and a device for treating a liquid leaving said target, the treatment device being in accordance with the invention and the gas separator being inserted downstream of said hydrodynamic reactor, at a distance of less than 1 meter from the hydrodynamic reactor.

The target may in particular be selected from the group formed by a heat exchanger, a cooling tower, a pool, in particular an open-air pool, especially a public or private swimming pool, a cooling or air-conditioning circuit, a heating circuit, a filtration circuit, a reverse osmosis demineralization circuit, a domestic hot water circuit, or a drinking water distribution circuit.

In one embodiment, the liquid circulates in a closed loop in the system.

Preferably, the liquid is maintained under pressure and/or without contact with the atmosphere, except in the target optionally. Preferably the pressure is greater than atmospheric pressure at any point of the circuit, except in the target optionally.

The invention finally relates to a process for treating a liquid containing dissolved gases, said process consisting in passing said liquid through a device according to the invention under suitable thermodynamic conditions so that the hydrodynamic reactor generates bubbles.

Definitions

The positions "upstream" and "downstream" are determined with respect to the flow direction of the liquid during the treatment thereof.

The expression "comprising a" should be understood as meaning "comprising at least one", unless otherwise indicated.

The expressions "in particular" or "especially" are synonyms and are not limiting.

The "equivalent diameter" of a cross section of area A refers to the diameter of a circular cross section of identical area A. For a circular cross section, the equivalent diameter is therefore equal to the diameter.

The "transverse plane" refers to a plane perpendicular to the main flow direction of the liquid.

BRIEF DESCRIPTION OF THE FIGURES

Other features and advantages of the invention will become more apparent on reading the detailed description which follows and on examining the appended drawing, provided for illustrative and nonlimiting purposes. In this drawing, FIG. 1 schematically represents a system according to the invention.

In the various figures, identical or similar members have been marked with the same references.

DETAILED DESCRIPTION

Figure 1:
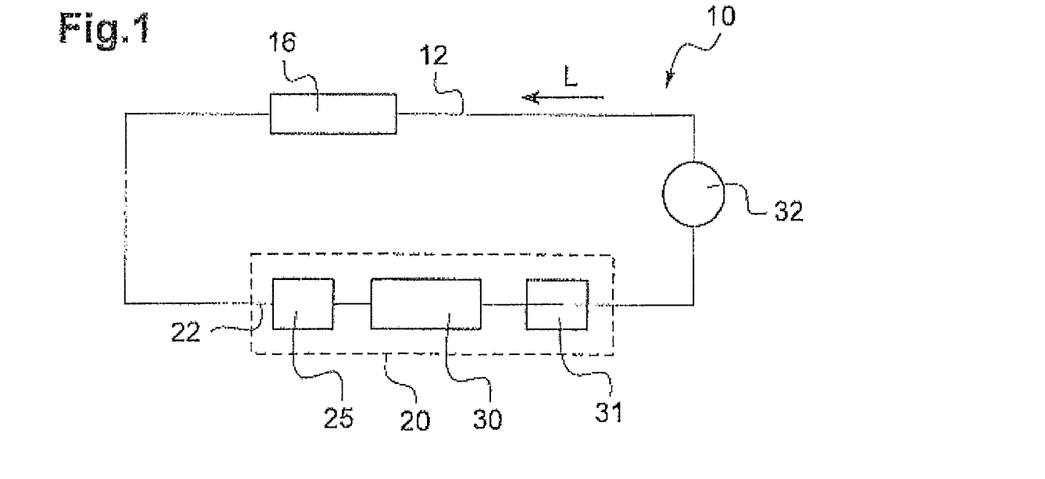

FIG. 1 represents a system 10 according to the invention comprising a closed circuit 12 in which a liquid L circulates. A target, in this case a radiator 16, and a treatment device 20 according to the invention are inserted into the circuit 12, the treatment device 20 being upstream of the target.

The treatment device 20 comprises a duct 22 into which are inserted, from upstream to downstream (upstream and downstream being determined by the flow direction of the liquid in the duct 22), a hydrodynamic reactor 25, a gas separator 30 and a filter 31. The system 10 also comprises a pump 32, inserted upstream or downstream of the treatment device 20, that makes it possible to circulate the liquid L.

The circuit 12 may be open, semi-open, or closed, as represented, with or without makeup liquid, with or without bringing the liquid into contact with the atmosphere.

The system 10 is not limited and may especially be a system for general cold water, domestic hot water, heating water, air-conditioning water, cooling water, drinking water, industrial water, water for watering or/and irrigation, water for fire protection, swimming pool water or water for a bathing and therapeutic pool. This system may be in a residential or tertiary building, for example a hospital or a school.

Hydrodynamic Reactor

Any device capable of producing a sudden drop in pressure in the liquid in order to create, by cavitation, bubbles, in particular microbubbles, may be used as hydrodynamic reactor 25.

The hydrodynamic reactor comprises a portion in which the flow area is smaller than that of the duct into which the hydrodynamic reactor is inserted. Preferably, the hydrodynamic reactor comprises at least two such portions.

A simple expansion of the liquid by reduction of its flow area is not however sufficient to create cavitation if the flow remains laminar. The expansion must therefore be sudden in order to create high turbulence and pressure gradients that are locally very high.

Preferably, the hydrodynamic reactor is passive, i.e. does not comprise an energy consumer, in particular a motor. More preferably, the hydrodynamic reactor does not comprise moving parts.

The hydrodynamic reactor may in particular comprise an acceleration zone constituted of one or more first channels that open upstream into an upstream chamber, the liquid accelerating between the upstream chamber and the first channels.

Preferably, the $S''/\Sigma''$ ratio may be greater than 2, greater than 5, greater than 10, greater than 20, greater than 50, greater than 100, or greater than 200 and/or less than 1000, less than 500, less than 400, or less than 300, S″ denoting the cross section of the upstream chamber measured in a transverse plane immediately upstream of the region in which the first channels open into the upstream chamber;

Σ″ denoting the sum of the transverse cross sections of said first channels measured in a transverse plane immediately downstream of the region in which they open into the upstream chamber.

The first channels may have a convergent longitudinal cross section, for example of nozzle shape, so as to gradually accelerate the flow.

The first channels are preferably parallel to one another. They may or may not be rectilinear. In particular, they may extend along the flow direction of the liquid. The number of first channels is preferably greater than 3, greater than 5, greater than 10, greater than 20, greater than 30 and/or less than 200, less than 150, less than 100, less than 80, less than 60. The transverse cross section of the channels may be any shape, for example circular. In one embodiment, the first channels have a substantially constant transverse cross section over their entire length.

The equivalent internal diameter of the first channels is preferably greater than 2 mm, greater than 10 mm, or greater than 15 mm or greater than 20 mm and/or less than 50 mm, less than 40 mm, less than 35 mm. An equivalent internal diameter of around 30 mm is very suitable.

The length of the first channels is preferably greater than 20 mm, greater than 30 mm and/or less than 50 mm, less than 40 mm.

Of course, the hydrodynamic reactor may be adapted in order to bring about a cavitation that generates bubbles of various dissolved gases.

Preferably, the hydrodynamic reactor is configured in order to generate only microscopic bubbles.

In one embodiment, the treatment device comprises a heater, inserted upstream of the first channels, capable of increasing the temperature of the liquid entering the latter in order to improve the effectiveness thereof.

Heating the liquid is however generally expensive.

In one preferred embodiment, the liquid leaving the first channels enters a compression chamber. As will be seen in greater detail in the remainder of the description, the compression chamber contributes to the implosion of the cavitation bubbles and to the creation of advantageous reactions.

Preferably, the length of the compression chamber, measured along the flow direction, and in the Eulerian system of reduced coordinates, is greater than $0.5*L_1$ and/or less than $2*0.5*L_1$, $L_1$ being the length of said first channels relative to the compression chamber in question.

Preferably, the compression chamber has a volume greater than $0.0001$ dm$^3$, greater than $0.001$ dm$^3$, greater than $0.01$ dm$^3$, greater than $0.1$ dm$^3$ and/or less than $20$ dm$^3$, less than $10$ dm$^3$, less than $1$ dm$^3$.

The S/Σ ratio may be greater than 2, greater than 5, greater than 10, greater than 20, greater than 50, greater than 100, or greater than 200 and/or less than 1000, less than 500, less than 400, or less than 300, S denoting the cross section of the compression chamber measured in a transverse plane immediately downstream of the region in which the first channels open into the compression chamber;

Σ denoting the sum of the transverse cross sections of said first channels measured in a transverse plane immediately upstream of the region in which they open into the compression chamber.

A high S/Σ ratio advantageously enables the creation of microjets at the mouth of the first channels, which are very effective for generating cavitation.

In order to calculate the S/Σ ratio, all the first channels in question are taken into consideration.

If the device comprises several acceleration zones in which cavitation occurs, it preferably comprises respective compression chambers, downstream of each of these acceleration zones. All the compression chambers may have a substantially identical S/Σ ratio.

Preferably, the hydrodynamic reactor comprises a dielectric material positioned to be in contact with the liquid, preferably in a region where the liquid circulates at high speed. Preferably, said first channels are delimited by an internal wall made of such a dielectric material. The first channels may be made in a block made of said dielectric material.

The dielectric material is preferably a plastic, for example polytetrafluoroethylene (PTFE), nylon, polypropylene, polyvinyl chloride (PVC) or a mixture of these materials. Other dielectric materials, for example ceramics, may also be used insofar as they make it possible, by circulation of the liquid, to generate a static electric charge by triboelectrification.

PTFE is the preferred dielectric material. Specifically, this dielectric material prevents the solid matter of the liquid from adhering to the surface of the dielectric material.

The hydrodynamic reactor preferably comprises a portion made of an electrically conductive material, positioned along the path of the liquid so as to create, via galvanic effect, redox phenomena.

More preferably, the electrically conductive material is zinc.

The hydrodynamic reactor may in particular comprise a plurality of second channels delimited by an internal wall made of said electrically conductive material. The second channels may be made in a block made of said electrically conductive material. In one embodiment, the compression chamber is positioned, along the path of the liquid, between the first channels and the second channels, or vice versa, between the second channels and the first channels.

The second channels, like the first channels, may be the source of cavitation bubbles. They may be parallel to one another. They may or may not be rectilinear. In particular they may extend along the longitudinal axis of the hydrodynamic reactor. The number of second channels is preferably greater than 2, greater than 3, greater than 5, greater than 10, greater than 20, greater than 30 and/or less than 100, less than 80, less than 60. The transverse cross section of the second channels may be any shape, for example circular. In one embodiment, the second channels have a substantially constant transverse cross section over their entire length.

The equivalent internal diameter of the second channels is preferably greater than 2 mm, greater than 4 mm, or greater than 5 mm and/or less than 15 mm, less than 13 mm, less than 10 mm, less than 8 mm, or less than 7 mm.

In one embodiment, the equivalent internal diameter of the second channels is greater, or 1.1, 1.5, 2 or 3 times greater, than that of the first channels.

The length of the second channels is preferably greater than 20 mm, greater than 30 mm and/or less than 50 mm, less than 40 mm.

The compression chamber is preferably common to several first and/or second channels, or common to all of the first and/or second channels.

Preferably, the first channels do not open opposite the second channels, which prevents the liquid leaving a first channel and that has passed through the compression chamber from entering a second channel by following a rectilinear path.

The first channels, optionally the second channels, and the compression chamber, are grouped together within the hydrodynamic reactor.

The hydrodynamic reactor may comprise a housing comprising an inlet and an outlet for the liquid.

The housing may comprise a body, preferably a cylindrical body, and one or more end caps, for example screwed onto the body. The end caps may in particular define the inlet and outlet of the hydrodynamic reactor. The length of an end cap is not limited.

Preferably, the hydrodynamic reactor comprises couplings that enable the connection of the inlet and/or of the outlet to a pipe, for example a flange provided with bolt holes capable of cooperating with a corresponding flange of said pipe, or a male or female part to be screwed onto a female or male part, respectively, of said pipe. The couplings may be firmly attached to the optional end caps.

The housing, and in particular one or more end caps, may be made of an electrically conductive material, in particular made of steel.

At its longitudinal ends, the first block is delimited by an upstream face and a downstream face, at least one of said upstream and downstream faces preferably being concave.

The first block may in particular be constituted of said dielectric material.

The housing may contain a first block that defines a plurality of first channels delimited laterally, at least partially, by a wall made of a dielectric material, and opening, on the outlet side, into a compression chamber, said first channels being arranged so that the liquid passes through the hydrodynamic reactor from the inlet to the outlet by passing through at least one first channel and the compression chamber.

The housing may also contain a second block that defines a plurality of second channels delimited laterally, at least partially, by a wall made of an electrically conductive material. The second block may in particular be constituted of said electrically conductive material.

At its longitudinal ends, the second block is delimited by an upstream face and a downstream face, at least one of said upstream and downstream faces preferably being concave.

The second block may be positioned upstream or downstream of the first block, provided that a compression chamber is made inside said housing. The compression chamber may in particular be positioned between the first and second blocks or downstream of the most downstream block in the housing. In the preferred embodiment, the first and second blocks are arranged so that the liquid successively passes through the first channels, a compression chamber into which all the first and second channels open, then the second channels.

The openings through which the first and/or second channels open, in particular into the compression chamber, are preferably sharp so as to promote turbulent flow.

The first and second channels of the first and second blocks may have one or more of the optional features of the first and second channels described above in a general manner. The dielectric and electrically conductive materials may also be selected from the materials cited above.

Preferably, the hydrodynamic reactor comprises means for positioning the first and second blocks in the housing. These means may comprise longitudinal and/or angular (about the longitudinal axis) positioning stops, preferably mistake-proofing means. Advantageously, the downstream openings of the first channels may be thus positioned precisely and rapidly with respect to the upstream openings of the second channels which open into the same compression chamber.

As a variant, or in addition, the hydrodynamic reactor may comprise mechanical means for increasing the accuracy of the electrical contact and the contact pressure between said conductive material of the second channels and a metallic constituent of the housing of the hydrodynamic reactor. Preferably, the electrical contact between the conductive material defining the metallic second channels and a metallic constituent of the housing of the hydrodynamic reactor is provided by clamping. Preferably the second block bears against an end cap screwed onto the cylindrical body of the housing. Preferably, this screwing makes it possible to regulate the contact pressure between the second block and the end cap. More preferably, the second block has an overlength so that, during the screwing of the end cap, an edge of said second block cuts into the end cap.

Preferably, said electrical contact is dry, that is to say that the electrical contact zone is not in contact with the liquid circulating in the hydrodynamic reactor. For this purpose, seals may be positioned in order to isolate this contact zone. For example, first and second O-rings may be positioned between the housing and the second block, for example in the vicinity of the upstream and downstream faces of the second block.

The second block may bear elastically against the end cap.

In one embodiment, a second block is positioned at the junction between the body of the housing and an end cap, so as to overlap said junction.

The number of first and/or second blocks is preferably greater than 1, greater than 2 or greater than 3 and/or less than 10, less than 7 or less than 5.

In one embodiment, the hydrodynamic reactor successively comprises, from upstream to downstream, a first block, a compression chamber, a second block, a compression chamber, a first block, a compression chamber, a second block, a compression chamber, a first block and a compression chamber.

In one embodiment, the hydrodynamic reactor comprises a second block at each end of the housing, preferably each in contact with a respective end cap.

In one embodiment, the hydrodynamic reactor comprises one first block and two second blocks, the first block being positioned between the two second blocks.

The hydrodynamic reactor may be, for example, one of the hydrodynamic reactors described in patent EP-B2-680 457 or in WO 2011 033476, and in particular the hydrodynamic reactor sold under the name IONSCALE BUSTER® (ISB) by the company ISB WATER.

Figure 2:
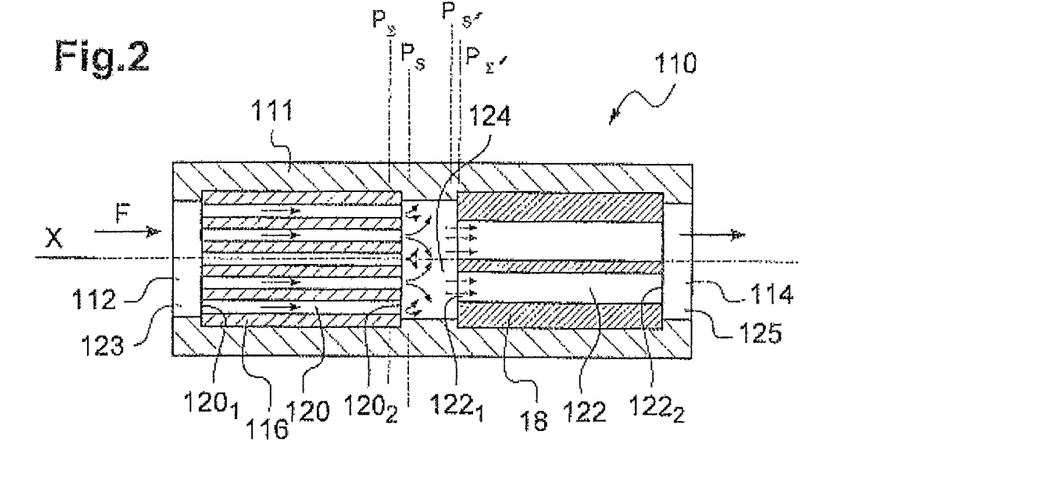
FIG. 2 represents, in longitudinal cross section, an example of a hydrodynamic reactor that may be used in a device according to the invention.

FIG. 2 schematically represents such a hydrodynamic reactor 110.

The hydrodynamic reactor 110, of longitudinal axis X, comprises a housing 111 provided with an inlet 112 and an outlet 114.

The housing 111 successively contains, from upstream to downstream, a first block 116 made of a dielectric material and a second block 118 made of an electrically conductive material. Preferably, the housing 111 is made of an electrically conductive material and is electrically connected with the sacrificial anode made of conductive material that constitutes the second block 118.

The first and second blocks are pierced longitudinally by first and second channels, referenced 120 and 122 respectively.

The first channels open upstream, toward the inlet 112, into an upstream chamber 123, through "upstream" openings $120_1$, and downstream, into a first cylindrical compression chamber 124, through "downstream" openings $120_2$.

The second channels 122 open upstream toward the first compression chamber 124, through "upstream" openings $122_1$, and downstream, toward the outlet 114, into a second compression chamber 125 through "downstream" openings $122_2$.

The diameter of the upstream chamber 123 and of the first compression chamber 124 may be 270 mm. All the first channels, 9 in number, may have an internal diameter of 6.3 mm. The $S/\Sigma$ ratio is therefore approximately 200, S denoting the cross section of the first compression chamber 124 measured in a transverse plane $P_S$ immediately downstream of the "downstream" openings $120_2$ of the first channels;

$\Sigma$ denoting the sum of the transverse cross sections of said first channels measured in a transverse plane $P_\Sigma$ immediately upstream of these "downstream" openings.

The second compression chamber 125 and the downstream openings $122_2$ of the second channels may have a configuration similar, or even identical, to that of the compression chamber 124 and of the downstream openings $120_2$ of the first channels which is described above.

Furthermore, all the second channels, 3 in number, may have an internal diameter of 9 mm. The $S'/\Sigma'$ ratio, S' denoting the cross section of the first compression chamber 124 measured in a transverse plane $P_S'$ immediately upstream of the "upstream" openings $122_1$ of the second channels;

$\Sigma$ denoting the sum of the transverse cross sections of said second channels measured in a transverse plane $P_\Sigma'$ immediately downstream of these "upstream" openings, may be greater than 2, greater than 5, greater than 10, greater than 20, greater than 50, greater than 100, or greater than 200 and/or less than 1000, less than 500, less than 400, or less than 300.

A high $S'/\Sigma'$ ratio advantageously enables the creation of a significant back pressure at the mouth of the second channels, highly effective for eliminating the cavitation bubbles generated by the first channels at the inlet of the compression chamber.

Since the first compression chamber 124 is cylindrical, S'=S.

In order to calculate the $S'/\Sigma'$ ratio, all the second channels in question are taken into consideration.

If the hydrodynamic reactor comprises several compression chambers, all the compression chambers of the hydrodynamic reactor may have a substantially identical $S'/\Sigma'$ ratio.

The upstream chamber 123 and the upstream openings $120_1$ of the first channels may have a configuration similar, or even identical, to that of the compression chamber 124 and of the upstream openings $122_1$ of the second channels which is described above.

All the first and second channels extend substantially along the axis X.

Gas Separator

The bubbles formed in the hydrodynamic reactor, optionally divided when crossing the compression chamber, are then trapped in the gas separator 30.

The cavitation-generating conditions disappear rapidly after the liquid has entered the compression chamber and the bubbles are therefore re-dissolved in the liquid. The gas separator is therefore positioned downstream of the hydrodynamic reactor, preferably at a distance of less than 2 meters, less than 1 meter, less than 0.5 meter, less than 0.2 meter, or even in contact with the hydrodynamic reactor.

Any device that makes it possible to extract the bubbles from the liquid may be used:

atmospheric gas separator: the atmospheric gas separator enables the liquid to be brought into contact with air, which results in particular in the elimination of the dissolved $CO_2$, even better when the liquid is finely divided and the air is rapidly replaced;

thermal gas separator: spraying the liquid into a counter current flow of steam at temperatures close to 105° C. enables the almost complete elimination of the dissolved gases contained in the liquid;

degassing by reduction in pressure or drawing a vacuum: vacuum degassing is used at temperatures below atmospheric boiling point. The liquid is reduced to fine droplets, which favor the degassing of the dissolved gases.

In the gas separator, the liquid is preferably kept pressurized. Preferably, in the gas separator, the liquid is kept mobile. Preferably, in the gas separator, the liquid does not have a horizontal contact surface with a gas, as in a pool for example.

In particular, the gas separator may be a coalescing separator.

Coalescing separators may be constructed in a simple and very compact manner. They are particularly suitable for degassing closed circuits that are in operation.

These separators combine various operating principles:
slowing down of the flow velocity,
installation of devices for optimizing the role of the upward (buoyancy) forces and centrifugal separation,
presence of foreign bodies suitable for promoting coalescence.

Within a coalescing separator, the accumulated gas bubbles fuse together, according to the well-known phenomenon of coalescence, thus forming bubbles of larger sizes which, under the buoyancy force, rise to an interface of the liquid where they may be evacuated from said liquid.

Figure 3:
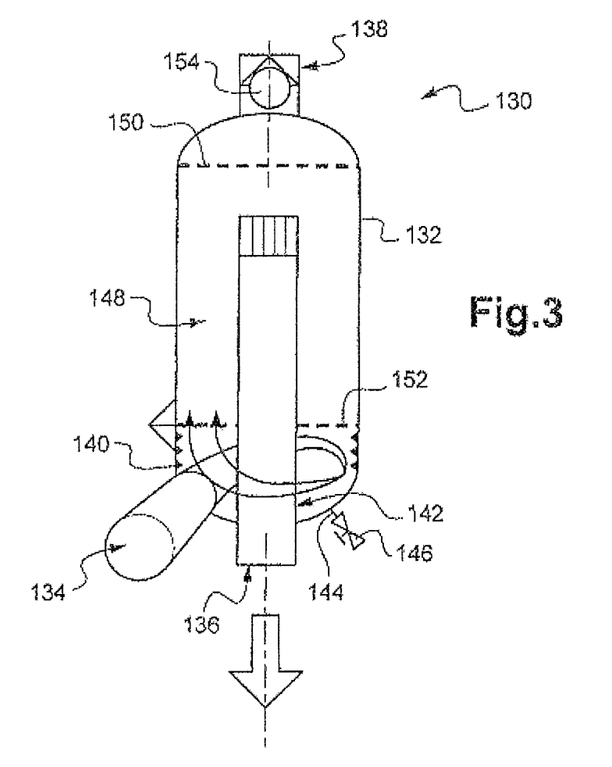
FIG. 3 represents an example of a coalescing gas separator.

In one embodiment represented in FIG. 3, the coalescing separator 130 comprises a tank 132, preferably that is vertical, for example cylindrical, provided with a liquid inlet 134, a liquid outlet 136 and a gas outlet 138.

The liquid inlet opens preferably substantially tangentially into the tank. Preferably, the separator comprises intake guiding fins 140 positioned to improve the centrifugation of the incoming liquid.

The gas outlet, intended for the evacuation of the gases extracted, is preferably positioned in the upper part of the tank.

The liquid outlet is preferably positioned in the lower part of the tank and is extended, inside the tank, by an internal cylinder 142, that extends to a height, measured from the bottom of the tank, corresponding to around ⅔ of the height of the tank.

The tank may also be provided with a purge orifice 144 provided with an isolation valve 146, placed in the lower part of the tank and intended to facilitate the tank draining and purging operations.

The tank is partially filled with packing 148 intended to favor the gas bubble coalescence phenomenon. The packing may be positioned in the volume defined by the shell of the tank, the internal cylinder and upper 150 and lower 152 support plates that are preferably perforated. Preferably the upper and lower support plates are located, starting from the top and the bottom of the tank respectively, at around ¼ of the height of the tank.

The packing may in particular comprise Raschig rings, for example sold by Pall Corporation (Pall-Rings).

The tank preferably has an internal diameter that is large enough to substantially reduce the flow rate of the liquid treated, preferably so as to ensure a flow rate of less than 3 m/s, less than 2 m/s, or less than 1 m/s.

The size of the packing elements is adapted to the internal volume of the separator and to the service conditions dictated by the target.

The gases thus captured may be released outside of the circuit, preferably with the aid of an automatic drain valve 154.

Means for Separating Suspended Particles

In order to separate the suspended particles, settling means or a filter may in particular be used.

The filter 31, positioned downstream of the hydrodynamic reactor, makes it possible to extract suspended particles. The principle of filtration is to erect a physical barrier to the flow of the particles having a size greater than the filtration threshold. Filtration improves the quality of the liquids, and thus protects the equipment and limits the risks of scaling, silting and corrosion, and also the bioproliferation of microorganisms such as algae and bacteria.

The filter 31 may in particular be positioned between the hydrodynamic reactor and the gas separator or downstream of the gas separator, preferably downstream of the gas separator, preferably in-line so as to treat all of the flow ("in-line"). A portion of the flow may however be diverted to a parallel ("on-line") treatment circuit.

The filter may in particular be selected from the group formed by a brush filter, a disc filter, a granular media filter, an ultrafiltration membrane, a nanofiltration membrane, in particular alone or downstream of an ultrafiltration membrane, and a reverse osmosis membrane.

A brush filter makes it possible to mechanically eliminate the particles by passing the liquid through the fibers of a brush installed in a casing. A brush filter is particularly suitable for filtering particles having a size of greater than 100 μm. Preferably a brush filter is used for residential and tertiary, GCW (general cold water), DHW (domestic hot water), heating and air conditioning systems, or for small cooling circuits.

A disc filter makes it possible to mechanically eliminate the particles by passing the liquid through stacks of grooved discs, for example made of polypropylene. A disc filter is particularly suitable for filtering particles having a size of between 20 μm and 200 μm. Preferably a disc filter is used for systems for drinking water, water for watering or/and irrigation, water for fire protection, industrial water or cooling water, or for large residential and tertiary facilities, for example for hospitals or schools.

A granular media filter makes it possible to mechanically eliminate the particles by passing the liquid through an aggregate positioned in a pressurized casing. The contaminants are eliminated by retention and/or adsorption as a function of the filtration media. A granular media filter is particularly suitable for filtering swimming pool water and water for bathing or therapeutic pools, water for cooling towers and circuits, or water where there is significant contamination by colloidal particles.

An ultrafiltration membrane makes it possible to eliminate suspended particles, bacteria and viruses and also the largest organic molecules. An ultrafiltration membrane is particularly suitable for filtering particles having a size of around 0.01 micrometer. Preferably, use is made of a PES—7 bores—Internal/External module. An ultrafiltration membrane makes it possible in particular to eliminate $CaCO_3$ present in early form, forcibly precipitated in the hydrodynamic reactor, then stabilized in the gas separator. This advantageously results in a reduction of TH in the liquid. An ultrafiltration membrane is particular suitable for filtering drinking water, water for residential and tertiary facilities, GCW, DHW, heating and/or air-conditioning water, or small cooling circuits, water for watering or/and irrigation, water for fire protection, industrial water or cooling water, water for primary circuits of nuclear facilities, or other aqueous liquids contaminated by radioactive pollutants, or for large residential and tertiary facilities, for example for hospitals or schools.

Operation

The operation of the device is the following:

The liquid L is conveyed by the pump 14 in the circuit 12.

The liquid L originating from the target 16 enters the hydrodynamic reactor 110 in which its flow is modified in order to create a turbulent flow capable of locally creating cavitation.

More specifically, the liquid to be treated enters the hydrodynamic reactor 110 via the inlet 112 (arrow F represented in FIG. 2) and the upstream chamber 123.

The liquid then passes through the first channels 120 made in the first block 116 made of a dielectric material.

The entry into the first channels is accompanied by a sudden acceleration of the liquid and a reduction in the pressure which lead to the appearance of cavitation. The operating conditions (flow rate, pressure) are determined so that the expansion gives rise to cavitation. With an ION-SCALE BUSTER® hydrodynamic reactor, the velocity of the liquid at the inlet of the hydrodynamic reactor (into the upstream chamber 123) is preferably greater than 2 m/s and/or less than 15/ms, less than 12 m/s, less than 10 m/s, less than 8 m/s, or less than 6 m/s, or less than 4 m/s, and the pressure at the inlet of the hydrodynamic reactor is preferably greater than 1 bar and/or less than 20 bar, less than 10 bar, or less than 5 bar.

The book "CAVITATION AND BUBBLE DYNAMICS" by Christopher Earls Brennen, published by Oxford University Press, 1995 describes the conditions that make it possible to obtain hydrodynamic cavitation.

Cavitation is a well-known phenomenon resulting from a local pressure drop in a liquid owing to a geometric modification of the flow of this liquid. It is used in particular for obtaining free or emulsified disperse systems.

Figure 4:
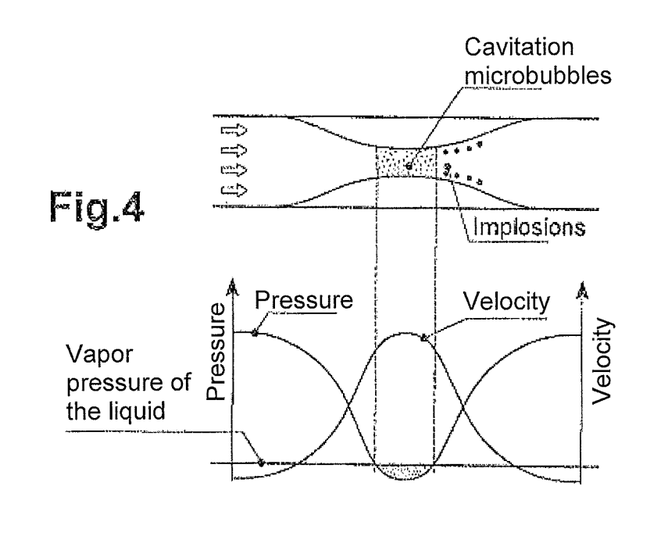
FIG. 4 illustrates the phenomena of cavitation and of cavitation bubble implosion.

Cavitation results in the formation of gas-filled cavitation bubbles, within the liquid flow and/or on the boundary layer of the walls of the hydrodynamic reactor in which the flow takes place, as represented in FIG. 4.

If the pressure decreases to a value below which the liquid reaches a boiling point, a large number of cavitation bubbles are formed.

It is Henry's law that makes it possible to quantify the physical phenomenon of the release of a gas contained in a liquid, and which demonstrates that the more the temperature increases and/or the pressure drops, the more the liquid may release dissolved gases. This release of dissolved gases occurs in the form of bubbles, the size of which may vary from a few tens of micrometers to a few millimeters.

The ability of a hydrodynamic reactor to create bubbles by cavitation depends on many factors, the main ones of which are:

the pressure of the gas or gases dissolved in the liquid;

the nature and the physicochemical characteristics of the gas or gases present in the liquid;

the temperature of the liquid;

the pressure of the liquid;

the geometry of the hydrodynamic reactor;

the flow rate or flow velocity of the liquid.

The presence of baffles advantageously makes it possible to generate very sudden local contractions of the flow, which are favorable to cavitation. Specifically, when the liquid flow goes past the point of contraction generated by a baffle, the liquid flow enters a reduced pressure zone, which favors the phenomenon of hydrodynamic cavitation.

The intensity of the cavitation is connected to the operating conditions by the cavitation number Cv.

The cavitation number Cv may be expressed in the following manner:

$$C_v = \frac{P_2 - P_v}{\frac{1}{2}\rho_l v_o^2}$$

where:

$P_2$ is the pressure downstream of the hydrodynamic reactor,

Pv is the vapor pressure of the liquid L at the operating temperature,

Vo is the mean velocity of the liquid L in the hydrodynamic reactor, $\rho_L$ is the density of the liquid.

The cavitation number for which the cavitation phenomenon begins to appear is Cv=1. The effects of the cavitation phenomenon will be even greater when the value of Cv is low.

The optimization of the cavitation phenomena in a hydrodynamic reactor is based on the conventional application of theoretical models that describe the flows of liquids in nozzles and Venturi systems.

The most suitable theoretical models are the models that relate to two-phase flows. A bubble flow through a Venturi may be modelled using equations of conservation of mass and of the amount of movement of the two phases present, combined with the dynamic equation of the bubble. The numerical resolution of this system makes it possible to study the influence of the variation of the radius of the neck of the Venturi and the effect of initial void fraction on the axial evolution of the radius of the bubble, of the pressure of the gas-liquid mixture and of the velocity of the flow.

Preferably, the hydrodynamic reactor is configured in order to generate bubbles having, for more than 50% by number, a diameter between 0.2 µm and 2 mm.

In practice, cavitation arises from "nuclei" or "seeds". These cavitation starting points are constituted by gaseous occlusions within the liquid, namely free microbubbles, gaseous particles attached to suspended solid impurities, or trapped in the crevices of solid walls, etc. Depending on the thermodynamic conditions of the flow and the geometry of said first channels, these nuclei may grow more or less explosively. In particular, in the presence of a pressure of a dissolved gas close to the saturation value of said gas, this gas will easily be released in the form of cavitation bubbles.

Advantageously, the very intense local thermodynamic and mechanical conditions generated by the cavitation also result in a destruction of certain pathogenic or non-pathogenic microorganisms, which could be present within the liquid.

In the first channels, the liquid rubs against the dielectric material. The rubbing of the liquid against the dielectric material gives rise to the accumulation of electrostatic charges at the surface of said dielectric material, thus generating a local electrostatic field capable of promoting the following reactions:

physicochemical precipitation of certain ions such as certain metal oxides, carbonates, sulfates, or phosphates;

coagulation of certain colloidal particles.

The colloidal particles are generally too fine to be retained by the majority of filtration systems and if a filter capable of separating them is installed, such as an ultrafiltration system, for example, they risk rapidly clogging the ultrafiltration membranes, and causing prohibitive pressure drops or reductions in flow rate.

Owing to the presence of the electrostatic effect generated by the dielectric material and to the coagulation of the colloidal particles that results therefrom, the size of the clusters of colloidal particles may reach a sufficient size so that they are retained effectively and economically in a filter.

More specifically, the colloidal particles often have a dissymmetry of their internal electric charges: the zeta potential. In the vicinity of the dielectric material, the elimination of this electrostatic barrier, which prevents the aggregation of the colloidal particles, is witnessed. Moreover, the frequency of the collisions between colloidal particles is greatly increased by the turbulence of the flow regime of the liquid caused by the cavitation.

Without being limited by this theory, the inventor considers that the electrostatic charge potential generated on the surface of the dielectric material originates from a portion of the kinetic energy of the flow of liquid that is converted into heat and electrical energy.

The electrostatic charge potential is a function of the intensity of the friction of the liquid and the area of the dielectric material over which the liquid circulates.

The accumulation of electrostatic charges causes an imbalance of potential between the surface of the dielectric material and the circulating liquid, and between the surface of the dielectric material and the metallic surfaces of the pipework of the circuit in which the liquid flows.

The positive or negative ions thus present in the liquid will bind together at the liquid-solid interface by various mechanisms such as electrostatic force, chemical adsorption, and the dissociation of polar groups, or by reaction between the liquid and the dielectric material.

When the ions originate from the dissociation of dissolved salts (thus creating positive and negative charges in equal amounts), the electrification phenomenon only occurs because one species of ions will be more strongly bonded to the dielectric material. A compact layer is thus established which is referred to as a "Helmholtz layer", named after the physicist who studied it in 1879. Gouy, another physicist, showed in 1910 that the ions of the other polarity organize themselves into a diffuse layer.

The thickness of the diffuse layer, or "Gouy layer", depends on the resistivity of the liquid: it is very small for a highly conductive liquid and it increases with the resistivity of the latter.

When the liquid is set in motion, this double layer will be separated, the Helmholtz layer remaining bonded to the solid-liquid interface, and the Gouy layer being entrained with the liquid. The accumulation of the charges in the liquid is governed by the diffusion of the ions toward the interface and by the resistivity p of the liquid.

The two-phase fluid then comes out into the first compression chamber 124. The inlet into the first compression chamber 124 leads to a reduction in the velocity, to a sudden increase in the pressure, and to a condensation inside the cavitation bubbles, which causes the implosion of most of the cavitation bubbles, generating pressure pulses, the amplitude of which may be very high (see FIG. 4).

These very sudden implosions have the result of forming shockwaves which in turn generate physicochemical or thermodynamic and mechanical phenomena, such as the breakup of any material that is close to the bubbles that implode.

Thus, during the rupture of the cavitation bubbles, very high pressures and very high local temperatures are achieved: the temperature within the bubbles may thus reach values of the order of 5000° C. and the pressure may reach values of the order of 500 kg/cm$^2$ (K. S. Suslick, Science, Vol. 247, 23 Mar. 1990, p. 1439-1445).

These temperature and pressure conditions activate, inside a bubble or in the liquid in the vicinity of said bubble, physicochemical and thermodynamic reactions, in particular the precipitation of carbonates and the release of $CO_2$.

As explained above, the presence of the dielectric material favors the amplitude of the calcium carbonate ($CaCO_3$) precipitation phenomena and the agglomeration of other colloidal compounds, by a weakening of the Zeta potential barriers. Advantageously, this precipitation makes it possible to reduce the concentrations of additives and to limit the frequency of replacing the working liquid. This precipitation also limits the amplitude of the corrosion phenomena by the formation of a protective film, referred to as a Thillmann film, and thus ensures a certain electro-galvanic protection of the system.

Furthermore, a process of emulsification, homogenization and dispersion may be obtained owing to the kinetic energy generated by the implosions of the cavitation bubbles.

The shape of the "downstream" openings of the first channels 120 opening into the first compression chamber 124 may be adapted in order to maximize the turbulence and the pressure modifications, for example by arranging obstacles or divergent sections thereon. The hydrodynamic conditions in the first compression chamber 124 also contribute to the coagulation by ensuring a strong mixing of the liquid. It is therefore particularly advantageous for the first compression chamber to be downstream of the dielectric material, which initiates the coagulation.

The first compression chamber 124 separates the "downstream" openings of the first channels from the "upstream" openings of the second channels.

The liquid leaving the first compression chamber 124 thus enters the second channels 122 of the second block 118. Preferably, the second channels are not however aligned axially with the first channels in order to promote turbulence and subsequent precipitation.

The entry of the liquid into the second channels 122 results in a sudden acceleration of its velocity. The transition region between the compression chamber 124 and the second channels 122 therefore constitutes a region of acceleration of the flow and of appearance of cavitation.

The liquid also comes into contact with the electrically conductive material defining the second channels, preferably made of zinc.

The "Daniell cell" effect generated by the Zn—Fe electrogalvanic pair gives rise to a transfer of electrons capable of providing anti-corrosion protection (cathodic protection). The zinc, a metal that is a better reducing agent than iron, or else than copper, is in fact oxidized instead of the less reducing metals of the system.

The "battery" effect also enables a release of Zn+ ions within the liquid, owing to the electrolytic reaction that is spontaneously established between the zinc anode and the less reducing metals of the system, for example the housing of the hydrodynamic reactor when it comprises iron. These ions thus released into the liquid may act as nuclides for the appearance and development of the heterogeneous primary nucleation reactions.

In particular, the presence of these zinc ions enables an agglomeration of the calcium and magnesium ions contained in the water around the zinc ions. The nuclides thus formed enable a modification of the local crystallisation conditions of the calcium and magnesium carbonates, giving rise to an extremely large and very rapid secondary nucleation phenomenon. This phenomenon is observed in the presence of crystals of the substance to be crystallized (described as initiators) and essentially in a stirred medium. The rate of production of these secondary nuclei depends on the rate of stirring of the medium, on the amount of initiators, and on the supersaturation of the liquid.

The geometry of the hydrodynamic reactor, in particular owing to the powerful mixing caused within the liquid, and the compression chamber, via the implosion of the cavitation bubbles, therefore cooperate with the dielectric material and the electrically conductive material in order to promote and accelerate physicochemical precipitation and coagulation. This calculation is particularly useful for extracting liquid from metals such as aluminum, bromine, chromium or strontium, in particular from radioactive metals.

At the outlet of the second block 118, the liquid enters the second compression chamber 125, which makes it possible again to implode most of the cavitation bubbles.

The persistence time of the residual bubbles depends on the flow regime and on the geometry of the hydrodynamic reactor. In the section of pipe located downstream of the hydrodynamic reactor, it is typically less than 20 seconds, less than 5 seconds, or less than 2 seconds.

The liquid L loaded with microbubbles must therefore rapidly enter the gas separator so that the bubbles can be trapped and released outside of the circuit of the system. The gas separator is therefore preferably positioned in the vicinity of the hydrodynamic reactor.

The fact of thus eliminating the dissolved gases, and in particular the dissolved oxygen ($O_2$) and the carbon dioxide ($CO_2$) resulting from the early precipitation of calcium carbonate ($CaCO_3$), makes it possible to obtain better operating conditions of the system:
  reduction in noise problems,
  reduction in corrosion problems,
  elimination of possible localized overheating zones,
  elimination of possible mechanical (pump, valve, gate, etc.) degradations.

The gas pressure in the liquid leaving the gas separator is therefore less than that in the liquid entering the hydrodynamic reactor (except possibly for $CO_2$, the latter possibly being produced by precipitation of carbonates in the hydrodynamic reactor). The harmfulness of the dissolved gases is therefore reduced, without it being necessary to add additives.

After having left the gas separator, the liquid passes through the filter 31, which makes it possible to retain, at least in part, the particles generated in the hydrodynamic reactor and, preferably, other particular pollutants that might be damaging for the system. The liquid then continues its journey to the target or the pump 14.

The treatment device according to the invention may be used in all applications in which the presence of a dissolved gas in the liquid is potentially harmful. In particular, it may be used in a cooling tower or in a swimming pool. Unlike a closed heating circuit, the liquid (cooling liquid, swimming pool water) evaporates, for example by venting to atmosphere, which requires makeup liquid. Certain compounds initially present in the makeup liquid and certain treatment additives do not evaporate. Their concentration therefore has a tendency to increase in the liquid. When the concentration of additives reaches a critical level, the liquid must be partly replaced (deconcentration purges) or completely replaced (draining operations). Conventionally, in a cooling tower, the water must be replaced when the concentration of additives has doubled or tripled.

The treatment device makes it possible to limit the addition of additives, which are generally harmful to health and to the environment, and to reduce the frequency of replacing the liquid. Tests have for example shown that, owing to a device according to the invention, the frequency of replacement may be divided by four with a 600 kW cooling tower. The treatment device additionally makes it possible to protect the circuit of the cooling tower against scaling and corrosion.

In a swimming pool, an injection of chlorinated products is necessary in order to sufficiently disinfect the bathing water. This injection of chlorine, combined with the nitrogen-containing pollution introduced by the bathers, gives rise to the formation of chloramines which are harmful to health. The treatment device makes it possible to limit, or even eliminate, the addition of chlorinated products. In an 800 $m^3$ swimming pool, tests have shown that the device according to the invention makes it possible to reduce, very economically, the production of chloramines to values below the recommended standards. The target may also be a filtration apparatus, for example a reverse osmosis filtration apparatus, in particular in a plant for demineralization or potabilization of water by reverse osmosis. Such a device typically comprises a membrane passed through by the water to be demineralized. Precipitation phenomena, upstream of this membrane, have a tendency to clog it and it is therefore conventionally necessary to add scale inhibitor or sequestrant chemicals.

The use of a device according to the invention advantageously makes it possible to protect the apparatus, by limiting, or even eliminating, these additions of sequestrants, which are often harmful to health and to the environment.

As described above, the inventor has observed that a homogeneous nucleation and an early precipitation of the crystals of salts of certain ions present in the liquid to be treated, such as carbonates, sulfates, or other similar compounds, in non-adherent crystallographic forms (such as ACC or MCC in the case of calcium carbonates), take place in the hydrodynamic reactor.

The hydrodynamic reactor also enables an aggregation or agglomeration, by the intense mechanical effects which prevail within the hydrodynamic reactor, of colloidal particles, such as the amorphous forms of the primary nucleation of calcium carbonates.

The particles thus formed may advantageously have a sufficient size to remain at the outer surface of the membrane, and been trained in the flow of concentrate. They may then be extracted from the liquid, for example by filtration. A hydrodynamic reactor placed upstream of a reverse osmosis membrane thus makes it possible to protect it.

A treatment device according to the invention may also be used to treat the water of the primary circuits of nuclear power plants, or more generally aqueous liquids contaminated by radioactive metal ions. A hydrodynamic reactor according to the invention may indeed make it possible to precipitate and to coagulate this contamination, and then to extract it from the liquid.

As is now clearly apparent, the invention provides a solution that makes it possible to treat a liquid by limiting the recourse to additives, for example by injection of acids or sequestrants and/or by limiting the replacement thereof in the system.

Of course, the present invention is not however limited to the embodiments described and represented.

In particular, for the hydrodynamic reactor described above, the number or the shape of the first channels may be different from those of the second channels, the number of first blocks may be identical to or different from the number of second blocks, the first blocks are not necessarily positioned alternately with the second blocks along the axis of the hydrodynamic reactor, and the number and the shape of the compression chambers may be different.

The number of hydrodynamic reactors in the treatment circuit is not limiting.

The filter may also carry out a bubble separation function, the separator and the filter possibly even being combined in one and the same apparatus.

The first channels are not necessarily made of a dielectric material and the second channels are not necessarily made of an electrically conductive material.

The first channels may be upstream or downstream of the second channels.

The invention claimed is:

1. A device for treating a liquid containing a dissolved gas, said device comprising:
    a hydrodynamic reactor,
        said hydrodynamic reactor comprising first channels that open downstream into a compression chamber and that are delimited internally by a dielectric material, the passage of the liquid in the first channels giving rise to the acceleration thereof and the generation of first cavitation bubbles,
        the compression chamber being configured in order to increase the pressure of said liquid when it penetrates said compression chamber so as to implode most of said first cavitation bubbles, and
        said hydrodynamic reactor further comprising second channels that open upstream into said compression chamber and that are delimited internally by an electrically conductive material, the passage of the liquid in the second channels giving rise to the acceleration thereof and the generation of second cavitation bubbles, and
    a gas separator capable of extracting from said liquid first cavitation bubbles optionally divided when crossing the compression chamber and second cavitation bubbles, the gas separator being positioned downstream of the hydrodynamic reactor at a distance of less than 2 m from the hydrodynamic reactor.

2. The device as claimed in claim 1, wherein the dielectric material is polytetrafluoroethylene and/or the electrically conductive material is zinc.

3. A system comprising a circuit, wherein a target and a device according to claim 1 for treating a liquid leaving said target are inserted, wherein the gas separator is adapted so that, in said gas separator, the liquid is maintained under pressure.

4. The system as claimed in claim 3, comprising, downstream of the treatment device, means for separating suspended particles selected from the group formed by a brush filter, a disc filter, a granular media filter, an ultrafiltration membrane, a nanofiltration membrane and a reverse osmosis membrane.

5. The system as claimed in claim 3, the target being selected from the group formed by a heat exchanger, a cooling tower, a pool, in particular an open-air pool, especially a public or private swimming pool, a cooling or air-conditioning circuit, a heating circuit, a filtration circuit, a reverse osmosis demineralization circuit, a domestic hot water circuit, or a drinking water distribution circuit.

6. The system as claimed in claim 3, the gas separator being a coalescing filter or a brush filter.

7. The system as claimed in claim 3, wherein a liquid circulates in the circuit, this liquid containing at least one compound containing an element selected from the group formed by chlorine, aluminum, bromine, chromium and strontium, in particular a radioactive metal.

8. The system as claimed in claim 3, wherein the dielectric material is polytetrafluoroethylene and/or the electrically conductive material is zinc.

9. The system as claimed in claim 3, wherein the gas separator is positioned at a distance of less than 1 m from the hydrodynamic reactor.

10. A process for treating a liquid containing dissolved gases, said process consisting in passing the liquid through a device as claimed in claim 1 under suitable thermodynamic conditions so that the hydrodynamic reactor generates second cavitation bubbles by cavitation, the gas separator being positioned downstream of the hydrodynamic reactor in order to trap said second cavitation bubbles.

11. The process as claimed in claim 10, said bubbles being divided by implosion before being trapped.

12. The process as claimed in claim 10, wherein the liquid circulates in a closed loop.

* * * * *